June 8, 1926.
A. EYMAEL ET AL
1,588,100
APPARATUS FOR RERUBBERING PNEUMATIC TIRES
Filed March 6, 1925  2 Sheets-Sheet 1
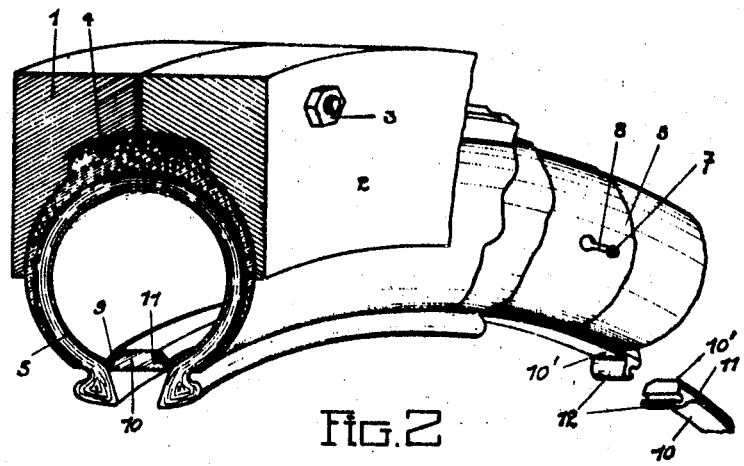
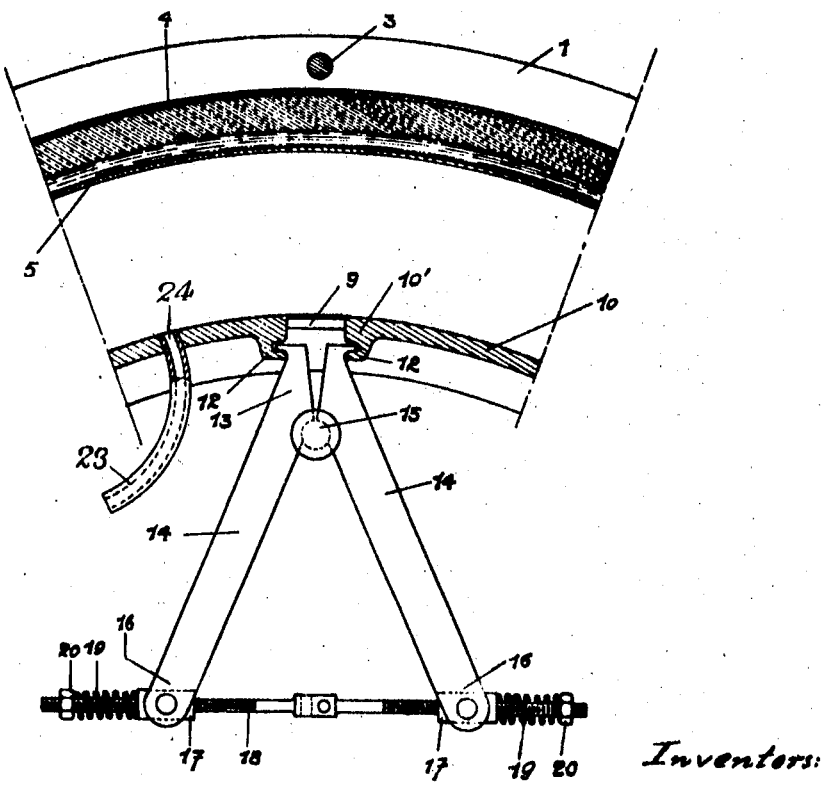
Inventors:
Arnaud Eymael
and Michel A. Dall'Este
By
Attorney June 8, 1926.　　　　　　　　　　　　1,588,100
A. EYMAEL ET AL
APPARATUS FOR RERUBBERING PNEUMATIC TIRES
Filed March 6, 1925　　2 Sheets-Sheet 2

Inventors:
Arnaud Eymael
and
Michel A. Dall'Este
By
Attorney.

Patented June 8, 1926.

1,588,100

UNITED STATES PATENT OFFICE.

ARNAUD EYMAEL AND MICHEL A. DALL'ESTE, OF BRUSSELS, BELGIUM.

APPARATUS FOR RERUBBERING PNEUMATIC TIRES.

Application filed March 6, 1925, Serial No. 13,569, and in Belgium March 14, 1924.

This invention relates to an apparatus for re-rubbering worn pneumatic tire covers in which the holding-up of the tire cover in the mould is effected by means of an inner expanding device.

In the known apparatus of this kind, the holding-up of the tire cover in the mould is effected by means of straps on rigid cores, flexible tubes, air chambers or water chambers, sand bags etc., placed inside the tire cover.

The improved apparatus of the present invention compries a mould composed of two parts inside which there may be arranged a removable metal band bearing in relief the designs that are to be reproduced upon the tire cover, an expansible tubular annulus, said annulus being composed of a suitable plurality of tubular elements contoured externally according to the inner contour of the tire cover and connected together in such a manner as to allow of any element moving relatively to the adjacent element, and finally an expanding device bearing against the annulus throughout the entire periphery of the latter, the ends of the said expanding device (after it has been placed in position) being adapted to be moved apart by means of a suitable tool in such a manner as to cause the annulus to fit closely against the entire inner surface of the tire cover.

For this purpose, according to a preferred constructional form, the inner edges of the tubular annulus are bent inwards, and the expanding device whose side faces have equal inclinations is adapted to engage like a wedge between the bent-in edges of the annulus in such a manner as, by expansion, to bring the said annulus with uniform pressure into contact with the whole of the inner surface of the tire cover.

Moreover, according to this invention, for the purpose of preventing an over-heating of the canvas layers of the tire a circulation of cold air or the like may be produced in the enclosed tube constituted by the annulus when expanded and closed by the expanding device.

A practical form of the improved apparatus of this invention is illustrated by way of example in the accompanying drawings in which:

Figure 1 is a perspective view, partly in section, of the improved apparatus; and Figure 2 is an elevation partly in section showing the tool for producing the expansion of the inner surface of the tire cover and its application to the improved apparatus illustrated in Figure 1.

Figure 3:
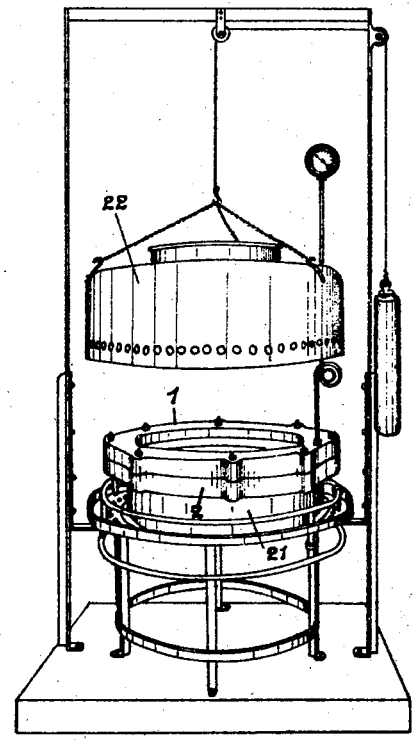
Figure 3 is a perspective view of a vulcanizing stove adapted for use with the improved apparatus of this invention.

In the illustrated example, the mould is composed of two parts 1 and 2, having internally the external shape of the tire cover.
These two mould parts are adapted to be fastened together by means of bolts 3. An interchangeable metallic band 4 is arranged inside these mould parts. This band bears in relief the design inscription to be made in the outer surface of the tire.

The tire is mounted on a tubular annulus 5 composed of a circular series of interfitting tubular elements having externally the internal contour of the tire and connected together in such a manner as to allow of their individual relative displacement by the action of the expanding device as hereinafter described. The manner of connecting shown in the drawings is effected by means of buttons or studs 7 mounted near the lower part on each side of one end of an element of the annulus, and adapted to engage in longitudinal slots 8 formed at the corresponding points of the other end of the adjacent annulus element.

The lower edges of the elements, that is to say, their edges situated towards the centre of the tire, are bent inwards as shown at 9.

10 is an expanding device composed of a metal strip bent in the form of a hoop the ends of which are not fixed together; this strip bears throughout the whole of its outer periphery against the tubular annulus 5.
For this purpose the side faces 11 of the strip are bevelled so as to bear against the bent-in edges 9 of the annulus. The expanding device 10 terminates at its ends 10'
in lugs 12 which allow the lever 13 (which
is to be used together with the improved apparatus for effecting the expansion of the tire cover) to engage and act upon the expanding device so as to move its two ends, 10' away from each other. In this manner the expanding device engages like a wedge between the edges of the annulus and presses it with a uniform pressure upon the entire inner surface of the tire cover.

The lever 13 is composed of two legs 14 pivoted on a pin 15, and fitted at their ends 16 with sleeves 17 which are adapted to move towards or away from each other according as the threaded rod 18 which supports them is rotated in one direction or the other.

The effects of the expansion and the placing of the material used for re-rubbering are directed against the legs 14 of the lever in such a way that the extremities of said legs tend to move apart, which causes the sleeves 17 to bear tightly against the threads of rod 18. In order to reduce the resistance to the friction produced by the rotation of said rod when it is desired to move the sleeves toward each other for the purpose of forcing apart the ends 10' of the expander 10, two powerful springs 19 are interposed between the sleeves 17 and the fixed nuts 20 on the opposite ends of the rod 18, which are thereby compressed. The re-rubbering material is thus compelled to fit closely against and in all the sinuosities of the mould.

The whole pressure thus produced acts upon the new rubber which adheres to the tire cover without the risk of straining the latter, because the annulus bears against the whole of the inner surface of the tire cover, and prevents the canvas layers from being overstrained during the operation of compressing and vulcanizing the rubber.

In order to avoid over-heating the canvas layers of the tire cover, a current of cold air may be caused to flow in the interior of the tubular annulus when the latter is closed by the expanding device.

The cold air may, for example, be discharged into the annulus 5 by a suitable device of any character connected to a tube 23 (Figure 2) which opens into an aperture 24 formed through the expander 10 at any desired point; and the air may escape through another aperture formed through said expander almost opposite the first one.

Figure 3 illustrates a vulcanizing stove capable of being used for re-rubbering pneumatic tire covers according to this invention. In this stove the mould 1—2 is mounted on a framing 21 upon which a bell or hood 22 can be lowered during the operation of vulcanizing, the stove being heated in the usual way.

It is to be understood that many modifications may be made in the shape and arrangement of the parts constituting the improved apparatus of the present invention without thereby departing from the scope of the said invention, and that the constructional form hereinbefore described and shown is given solely by way of explanatory example.

What we claim as our invention and desire to secure by Letters Patent is:

1. An apparatus for re-rubbering worn pneumatic tire covers in which the holding-up of the tire cover in the mould is effected by internal expansion, comprising a mould composed of two parts fitted internally with a removable band bearing in relief the designs or inscriptions to be reproduced upon the tire cover, an extensible annulus placed inside the tire cover and composed of a suitable number of tubular elements having externally the internal contour of the tire cover and being connected to one another in such a manner as to allow each tubular element to move relatively to the adjacent element, and an expanding device adapted to bear against the entire periphery of the annulus and so arranged that after it has been placed in position its ends can be moved apart by a suitable tool in such a manner as to apply the annulus against the entire internal surface of the tire cover.

2. An apparatus for re-rubbering worn pneumatic tire covers in which the holding-up of the tire cover in the mould is effected by internal expansion of an extensible annulus placed inside the tire cover, the lower edges of the annulus being bent inwards, said apparatus comprising an expanding device consisting of a metal strip bent in the form of a hoop having equally inclined lateral surfaces which are caused to bear like a wedge against the bent-in edges of the annulus, so that by moving apart the ends of the expanding device the said annulus is brought with uniform pressure into contact with the whole of the inner surface of the tire cover.

3. An apparatus for re-rubbering worn pneumatic tire covers in which the holding-up of the tire cover in the mould is effected by internal expansion of an extensible annulus placed inside the tire cover, such annulus being composed of a plurality of tubular elements movably connected to one another, and means for producing a circulation of cold air in the tube constituted by the annulus when expanded and closed by the expanding device, for the purpose of preventing over-heating of the canvas layers of the tire cover.

In testimony whereof we affix our signatures.

ARNAUD EYMAEL.
MICHEL A. DALL'ESTE.